United States Patent
Larrain

(10) Patent No.: US 11,492,576 B2
(45) Date of Patent: Nov. 8, 2022

(54) PROCESS FOR OBTAINING A SPARKLING ALCOHOLIC BEVERAGE WHERE WINE MACERATED IN HOPS IS MIXED WITH VEGETABLE WATER AND/OR WATER, AND ADDITION OF WINE CONCENTRATE AND CONCENTRATED FRUIT AND/OR VEGETABLE JUICE

(71) Applicant: EMPRESAS LOURDES S.A., Santiago (CL)

(72) Inventor: Diego Swinburn Larrain, Santiago (CL)

(73) Assignee: EMPRESAS LOURDES S.A., Santiago (CL)

( * ) Notice: Subject to any disclaimer, the term of this patent is extended or adjusted under 35 U.S.C. 154(b) by 1034 days.

(21) Appl. No.: 16/096,655

(22) PCT Filed: Oct. 4, 2016

(86) PCT No.: PCT/IB2016/055931
§ 371 (c)(1),
(2) Date: Oct. 25, 2018

(87) PCT Pub. No.: WO2017/191498
PCT Pub. Date: Nov. 9, 2017

(65) Prior Publication Data
US 2020/0385657 A1 Dec. 10, 2020

(30) Foreign Application Priority Data
May 5, 2016 (CL) .................................. 1074-2016

(51) Int. Cl.
| | |
|---|---|
| *C12G 1/06* | (2019.01) |
| *C12G 1/022* | (2006.01) |
| *C12G 1/00* | (2019.01) |
| *C12G 3/06* | (2006.01) |
| *C12H 1/044* | (2006.01) |
| *C12H 1/065* | (2006.01) |
| *C12H 1/07* | (2006.01) |

(52) U.S. Cl.
CPC .......... *C12G 1/0203* (2013.01); *C12G 1/005* (2013.01); *C12G 1/06* (2013.01); *C12G 3/06* (2013.01); *C12H 1/0408* (2013.01); *C12H 1/061* (2013.01); *C12H 1/063* (2013.01); *C12G 2200/21* (2013.01)

(58) Field of Classification Search
CPC . C12G 3/06; C12G 1/005; C12G 1/06; C12G 1/0203; C12H 1/0408; C12H 1/063; C12H 1/061
USPC ........................................................ 426/592
See application file for complete search history.

(56) References Cited

U.S. PATENT DOCUMENTS

| | | | |
|---|---|---|---|
| 2008/0292748 A1 | 11/2008 | Sato et al. | |
| 2010/0047386 A1 | 2/2010 | Tatera | |

FOREIGN PATENT DOCUMENTS

| | | |
|---|---|---|
| CN | 102 146 333 A | 8/2011 |
| CN | 105 002 033 A | 10/2015 |
| CN | 105 018 270 A | 11/2015 |
| FR | 2 580 665 A1 | 10/1986 |
| KR | 10-1197433 B1 | 6/2008 |

OTHER PUBLICATIONS

Buttonwood officially launches hops-infused wine Apr. 3, 2018 https://www.santaynezvalleystar.com/buttonwood-officially-launches-hops-infused-wine/ (Year: 2018).*
Trillium's Dialed-In IPA with Wine-Grape Must Recipe Mar. 6, 2018 https://beerandbrewing.com/homebrew-recipe-trilliums-dialed-in-ipa-with-wine-grape-must/(Year: 2018).*
New "Craft Wine" Made Using Hops May 14, 2015 https://punchdrink.com/news/new-craft-wine-made-using-hops/ (Year: 2015).*
International Search Report and Written Opinion issued in related International Patent Application No. PCT/IB2016/055931, completed Jan. 23, 2017.

* cited by examiner

*Primary Examiner* — Vera Stulii
(74) *Attorney, Agent, or Firm* — Foley & Lardner LLP

(57) ABSTRACT

The present invention discloses a process for preparing a sparkling alcoholic beverage resulting from the maceration of hops and/or its derivatives in wine with the addition of wine concentrate, vegetable water and/or water, fruit or vegetable concentrate and/or sugar, in order to reduce the alcohol content of wine, and which is gasified by a second alcoholic fermentation and/or addition of carbon dioxide. Through this process a sparkling alcoholic beverage having between 5 and 15% alcohol, a sugar content between 0.1 and 200 g/L, with a total acidity between 4 and 8 g/L is obtained having hops aroma, flavor and bitterness combined with aromas inherent to wine.

10 Claims, No Drawings

PROCESS FOR OBTAINING A SPARKLING ALCOHOLIC BEVERAGE WHERE WINE MACERATED IN HOPS IS MIXED WITH VEGETABLE WATER AND/OR WATER, AND ADDITION OF WINE CONCENTRATE AND CONCENTRATED FRUIT AND/OR VEGETABLE JUICE

FIELD OF THE INVENTION

The present invention relates to wine-based sparkling alcoholic beverages industry.

In particular, the present invention relates to a process for obtaining or making a wine-based sparkling alcoholic beverage resulting from a preparation process, wherein wine macerated in hops is mixed with vegetable water and/or water, to which wine concentrate and concentrated fruit and/or vegetables juice are added.

STATE OF THE ART

Alcoholic beverages can be classified into two major groups, those that are fermented alcoholic beverages which are all beverages produced by a biochemical mechanism called fermentation consisting of the processing of sugar from fruits, seeds or herbs made by yeast to obtain alcohol; and those spirits which are all substances obtained by distillation process where already fermented juices or musts are boiled to separate alcohol from water to obtain a beverage with a higher alcohol content.

Within fermented alcoholic beverages are sparkling beverages corresponding to beverages having carbon dioxide dissolved therein and which differ mainly by the raw material from which they originate. The most important are: beer, wherein the fermentable sugar comes from barley, cider originated from pomes and sparkling wine made from grapes.

The present invention discloses a sparkling alcoholic beverage which opens a new category in the market because it combines traditional processing techniques applied for different alcoholic beverages: beer, wine and sparkling wines, with the use of 100% natural raw materials and is intended to fulfill a niche not covered in the market mainly for being a wine-based beverage with low alcohol content, therefore with low calorie intake, and finished with the use of ingredients derived from other production processes such as the production of concentrated juice and wine and condensed vapors generated in these processes.

Chinese Patent Application CN102146333A describes a method for producing a blueberry and medlar sparkling wine. This wine comprises the following ingredients in parts by weight: 2-10 parts of blueberry juice, 2-8 parts of white granulated sugar, 1-5 parts of medlar juice, 0.2-1 parts of salt, 0.8-2 parts of citric acid, 2-8 parts of edible alcohol and 27-204 parts of purified water, and the pressure of added carbon dioxide is 4-6 MPa. This document does not interfere with the present invention since the main difference between both products is the method of obtaining alcohol and the carbon dioxide present in each beverage; while the present invention has alcohol derived from fermentation of sugars from raw materials that are involved in the process and the gas is correspondingly obtained from natural fermentation processes. The blueberry and medlar sparkling wine, on the other hand, have alcohol and gas from exogenous sources corresponding more to a spirits with addition of fruit juice and incorporation of carbon dioxide than to a sparkling wine, since the concept of wine is associated with fermentation of sugars from some raw materials with the resulting production of alcohol.

Patent Application KR1197433B1 describes a method of manufacturing sparkling fermented wine using defatted legumes crops and fruit juice. More specifically, the invention relates to a method of manufacturing sparkling fermented wine to transform defatted crops into sugar with liquefaction and producing a saccharified liquid, then adding the fruit juice into the saccharified liquid for alcohol fermentation. This document does not interfere with the present invention since the main difference between both products is the source of fermentable sugar for the production of alcohol; since the sugar in the present invention comes directly from the juice of the fruits being used, which provides inherent features of the fruit into the final product, sparkling legumes wine; these sugars must go through a process that transform their starches into easily fermentable sugar leaving a neutral product to which fruit juices should be added to provide some distinguishing feature.

As can be seen in the state of the art, there is no description on processes of maceration of hops in the wine itself and incorporation of concentrated wine for obtaining a sparkling alcoholic beverage.

DESCRIPTION OF THE INVENTION

The present invention discloses a process for preparing a sparkling alcoholic beverage resulting from the maceration of hops and/or its derivatives in wine with the addition of wine concentrate, vegetable water and/or water, fruit or vegetable concentrate and/or sugar, in order to reduce the alcohol content of wine, being gasified by a second alcoholic fermentation and/or by addition of carbon dioxide.

The concentrated wine is the result of subjecting wine at temperatures between 50° and 100° Celsius to evaporate volatile elements in the wine and to concentrate its solids.

The concentrated fruit and/or vegetable juice is the result of subjecting fruit or vegetable juice at temperatures between 50° and 100° Celsius to evaporate volatile elements in the wine and to concentrate its solids.

The vegetable water is obtained as a byproduct of the concentration process of fruit and/or vegetable juice through the condensation of vapors generated during the concentration process, which comprises subjecting clarified and filtered juice to temperatures between 50 and 100° C. in order to concentrate its solids and totally or partially removing the water therein.

Hops and/or derivatives thereof also made reference to flowers, plant parts, oils, essences, and other plant derivatives.

More specifically the present invention consist of a process for obtaining a sparkling alcoholic beverage comprising the steps:

a. receiving the white, pink or black grapes clusters, separating the grains from the stems, and crushing the grains;

b. adding between 0.1 and 10 g/hL of pectolytic enzyme and/or cellulases and/or hemicellulases to the crushed grains of step (a) and pressing said mixture of crushed grains and enzymes in a pneumatic press separating grape juice from skins and seeds;

c. clarifying the grape juice obtained in step (b), separating by decantation solids from grape juice by adding between 0.1 and 10 g/hL of pectolytic enzymes, cellulases and hemicellulases;

d. fermenting clarified the grape juice of step (c) by adding yeasts selected from *Saccharomyces cerevisiae* genus at doses between 10 and 50 g/hL and nitrogen compounds at doses between 10 and 100 g/hL, which ensure a correct alcoholic fermentation obtaining a wine between 11.5 and 14% alcohol;
e. clarifying the wine obtained in step (d) by physically separating the solid residues generated in the fermentation step by using drawing-off and/or centrifugation and/or earth, tangential or cloths filters; obtaining a wine with a turbidity level between 20 and 100 NTU.
f. stabilizing the wine from precipitation of tartaric salts, through cold treatment at temperatures in the range of −2 to 6° Celsius and/or by adding carboxymethylcellulose at doses between 0.1 and 10 g/hL.
g. adding hops or derivatives thereof to the wine obtained in step (e) at a dose between 0.1 and 10 g/L and macerating at room temperature for a time between 1 hour and one month.
h. mixing between 30% and 70% of the wine of step (g) and between 70% and 30% vegetable water or water in an isobaric tank. Adding between 0.1% and 10% white wine concentrate and adding concentrated white grape juice in a volume as to provide 0.1 to 200 g/L of sugar to the total mixture.
i. fermenting the mixture obtained in step (h) by adding 15 to 30 g/hL of yeasts selected from *Saccharomyces cerevisiae, Saccharomyces bayanus, Torulaspora delbrueckii, Schizosaccharomyces, Zygosaccharomyces*, or *Kluyveromyces* and fermenting for a time that may range from 1 hour up to 1 month at temperature between 8 and 30° C.; wherein between 10 and 50 g/hL of nitrogen compounds are added to ensure fermentation; obtaining a pressure of the gas generated in this fermentation varying from 100 kPa to 600 kPa.
j. filtering the beverage obtained in step (i) at temperatures under 10° C. adding concentrated white grape juice in a volume to provide between 0.1 and 200 g/L sugar or directly adding sugar together with acid citric at a concentration from 10 to 50 g/L and from 0 to 50 g/L, respectively.

As an optional step, it is possible to apply activated carbon to the grape juice obtained in step (b) to remove color, phenols and/or aroma, at a dose between 0.1 and 10 g/L. Filtering subsequently to remove carbon particles.

Additionally in step (c), water or vegetable water is added in a percentage in the range of 30 to 50% v/v.

Additionally in step (d), hops or derivatives thereof may be added at a dose between 0.1 and 10 g/L.

Nitrogen compounds are selected from ammonium salts, amino acids, peptides and polypeptides.

Fruits are selected from stone fruits, pomes, blackberries, strawberries, raspberries, blueberries, apple, grape, among others.

Vegetables are selected from: apiaceae, amaranthaceae, solanaceae, brassicaceae, and cucurbits.

As a result of the process described above, a sparkling alcoholic beverage having the following characteristics is obtained:

It is a sparkling fermented alcoholic beverage having between 5 and 15% alcohol, a sugar content between 0.1 and 200 g/L, with a total acidity between 4 and 8 g/L. In the aroma, flavor and characteristic bitterness inherent to hops combined with aromas inherent to white wine can be found fruity, floral and citrus notes in the nose and mouth. This is highlighted by the freshness granted by carbon dioxide with pressures ranging between 100 kPa and 600 kPa.

EXAMPLES OF APPLICATION

Example 1

Grapes of the Moscatel, Pedro Jimenez and Sauvignon Blanc varieties were separately received and subjected to a stem removal process where the grains are separated from the stems and then these grains were crushed. The crushed grains are taken to a pneumatic press prior applying a dose of 5 g/hL of a commercial preparation, acquired in the market for obtaining higher yields, which mixes pectolytic enzymes, cellulases and hemicellulases, the juice obtained in this process is clarified for separating solids from the liquid for which 5 g/hL of a commercial preparation of pectolytic enzymes that help facilitate this process were added. Juices already clarified were subjected to an alcoholic fermentation process, whereby yeast of *Saccharomyces cerevisiae* genus at 25 g/hL doses and a commercial preparation that mixes salts ammonia and amino acids at 50 g/hL doses, were added to ensure this process. Obtaining wine with average alcohol of 12% alcohol. Once the alcoholic fermentation is carried out, the wine was physically separated from the solid residues generated in the fermentation step and subjected to tartaric stabilization with treatment at −4° C. At this point, the wine produced from the Moscatel, Pedro Jimenez and Sauvignon Blanc grapes was proportionally mixed adding 33.33% of each variety in the mixture.

This mixture was macerated with 1 g/L commercial hops for 2 weeks at room temperature; after this time a mixture of 60% wine and 40% grape vegetable water was made, to which 1% wine concentrate of Sauvignon Blanc variety and 4% concentrated white grape juice were added. 15 g/hL of *Saccharomyces cerevisiae* yeast was added and fermented for 2 weeks at 15° C., during this time 20 g/hL of nitrogen compounds were added to ensure fermentation. This was made in an isobaric tank to retain the carbon dioxide produced in the fermentation generating a pressure of 400 kPa. Then it was filtered and 1% concentrated white grape juice was added to sweeten the beverage.

The product obtained from the previous step is a sparkling fermented alcoholic beverage having 8.5% alcohol, 10 g/L sugar content, with a total acidity of 6 g/L.

Example 2

Grapes of the Moscatel and Pedro Jimenez varieties were separately received and subjected to a stem removal process where the grains were separated from the stems and then these grains were crushed. The crushed grains were taken to a pneumatic press prior applying a dose of 7 g/hL of a commercial preparation, acquired in the market for obtaining higher yields, which mixes pectolytic enzymes, cellulases and hemicellulases, the juice obtained in this process was clarified for separating solids from the liquid for which 6 g/hL of a commercial preparation of pectolytic enzymes that help facilitate this process were added. Juices already clarified were subjected to an alcoholic fermentation process, whereby yeast of *Saccharomyces cerevisiae* genus at 25 g/hL doses and a commercial preparation that mixes salts ammonia and amino acids at 50 g/hL doses, were added to ensure this process. Obtaining wine with average alcohol of 12% alcohol. Once the alcoholic fermentation is carried out, the wine was physically separated from the solid residues generated in the fermentation step and subjected to tartaric stabilization. At this point, the wine produced from the Moscatel and Pedro Jimenez grapes was proportionally mixed adding 50% of each variety in the mixture.

This mixture was macerated with 2 g/L commercial hops for 2 weeks at room temperature; after this time a mixture of 50% wine and 50% grape vegetable water was made, to which 4% wine concentrate of Pedro Jimenez variety and 2% concentrated white grape juice were added. 15 g/hL of *Saccharomyces cerevisiae* yeast was added and fermented for 3 weeks at 14° C., during this time 25 g/hL of nitrogen compounds were added to ensure fermentation. Then it was filtered and 1% concentrated white grape juice was added to sweeten the beverage. Then, industrial carbon dioxide was injected into an isobaric tank to retain pressure until reach a pressure of 350 kPa.

The product obtained from the previous step is a sparkling fermented alcoholic beverage having 6.8% alcohol, 20 g/L sugar content, with a total acidity of 6.2 g/L.

Example 3

Grapes of the Moscatel, Pedro Jimenez and Sauvignon Blanc varieties were separately received and subjected to a stem removal process where the grains are separated from the stems and then these grains were crushed. The crushed grains were taken to a pneumatic press prior applying a dose of 5 g/hL of a commercial preparation, acquired in the market for obtaining higher yields, which mixes pectolytic enzymes, cellulases and hemicellulases, the juice obtained in this process was clarified for separating solids from the liquid for which 5 g/hL of a commercial preparation of pectolytic enzymes that help facilitate this process were added. Juices already clarified were subjected to an alcoholic fermentation process, whereby yeast of *Saccharomyces cerevisiae* genus at 25 g/hL doses and a commercial preparation that mixes salts ammonia and amino acids at 50 g/hL doses were added to ensure this process. Obtaining wine with average alcohol of 12% alcohol. Once the alcoholic fermentation is carried out, the wine was physically separated from the solid residues generated in the fermentation step and subjected to tartaric stabilization. At this point, the wine produced from the Moscatel, Pedro Jimenez and Sauvignon Blanc grapes was proportionally mixed adding 33.33% of each variety in the mixture.

This mixture was macerated with 1.5 g/L commercial hops for 3 weeks at room temperature; after this time a mixture of 70% wine and 30% water was made, to which 1% wine concentrate of Sauvignon Blanc variety and 1% concentrated plum juice were added. 15 g/hL of *Saccharomyces cerevisiae* yeast was added and fermented for 2 weeks at 15° C., during this time 20 g/hL of nitrogen compounds were added to ensure fermentation. This was made in an isobaric tank to retain the carbon dioxide produced in the fermentation generating a pressure of 150 kPa. Then it was filtered and 1.5% concentrated white grape juice was added to sweeten the beverage. Then, industrial carbon dioxide was injected into an isobaric tank to retain pressure until reach a pressure of 300 kPa The product obtained from the previous step is a sparkling fermented alcoholic beverage having 9% alcohol, with 15 g/L sugar content, with a total acidity of 6.3 g/L.

Example 4

Grapes of the Moscatel and Sauvignon Blanc varieties were separately received and subjected to a stem removal process where the grains were separated from the stems and then these grains were crushed. The crushed grains were taken to a pneumatic press prior applying a dose of 5 g/hL of a commercial preparation, acquired in the market for obtaining higher yields, which mixes pectolytic enzymes, cellulases and hemicellulases, the juice obtained in this process was clarified for separating solids from the liquid for which 5 g/hL of a commercial preparation of pectolytic enzymes that help facilitate this process were added. Juices already clarified were subjected to an alcoholic fermentation process, whereby yeast of *Saccharomyces cerevisiae* genus at 25 g/hL doses and a commercial preparation that mixes salts ammonia and amino acids at 50 g/hL doses were added to ensure this process. Obtaining wines with average alcohol of 12% alcohol. Once the alcoholic fermentation is carried out, the wine was physically separated from the solid residues generated in the fermentation step and subjected to tartaric stabilization. At this point, the wine produced from the Moscatel and Sauvignon Blanc grapes was proportionally mixed adding 50% of each variety in the mixture.

This mixture was macerated with 2 g/L commercial hops for 2 weeks at room temperature; after this time a mixture of 50% wine and 50% water was made, to which 6% wine concentrate of Sauvignon Blanc variety and 18 g/L sugar were added. 15 g/hL of *Saccharomyces cerevisiae* yeast was added and fermented for 2 weeks at 15° C., during this time 20 g/hL of nitrogen compounds were added to ensure fermentation. This was made in an isobaric tank to retain the carbon dioxide produced in the fermentation generating a pressure of 150 kPa. Subsequently, it was filtered and 23 g/L sugar and 1 g/L citric acid were added. Then, industrial carbon dioxide was injected into an isobaric tank to retain pressure until reach a pressure of 300 kPa.

The product obtained from the previous step is a sparkling fermented alcoholic beverage having 6% alcohol, with 25 g/L sugar content, with a total acidity of 6.5 g/L.

Example 5

Grapes of the Moscatel and Pedro Jimenez varieties were separately received and subjected to a stem removal process where the grains were separated from the stems and then these grains were crushed. The crushed grains were taken to a pneumatic press prior applying a dose of 7 g/hL of a commercial preparation, acquired in the market for obtaining higher yields, which mixes pectolytic enzymes, cellulases and hemicellulases, the juice obtained in this process was clarified for separating solids from the liquid for which 6 g/hL of a commercial preparation of pectolytic enzymes that help facilitate this process were added. To juices already clarified 40% v/v vegetal water was added and were subjected to an alcoholic fermentation process, whereby yeast of *Saccharomyces cerevisiae* genus at 25 g/hL doses and a commercial preparation that mixes salts ammonia and amino acids at 50 g/hL doses were added to ensure this process. Obtaining wines with average alcohol of 7% alcohol. Once the alcoholic fermentation was carried out, the wine was physically separated from the solid residues generated in the fermentation step and subjected to tartaric stabilization. At this point, the wine produced from the Moscatel and Pedro Jimenez grapes was proportionally mixed adding 50% of each variety in the mixture.

This mixture was macerated with 2.5 g/L commercial hops for 2 weeks at room temperature; after this time 4% wine concentrate of Pedro Jimenez variety and 1% concentrated white grape juice were added. 15 g/hL of *Saccharomyces cerevisiae* yeast was added and fermented for 3 weeks at 14° C., during this time 20 g/hL of nitrogen compounds were added to ensure fermentation. Then it was filtered and 2.5% concentrated white grape juice was added to sweeten the beverage. Then, industrial carbon dioxide was injected into an isobaric tank to retain pressure until reach a pressure of 350 kPa.

The product obtained from the previous step is a sparkling fermented alcoholic beverage having 7.2% alcohol, with 23 g/L sugar content, with a total acidity of 6.2 g/L.

The invention claimed is:

1. A process for obtaining a sparkling alcoholic beverage, comprising the following steps:
   a. receiving white, pink or black grapes clusters, separating berries from stems of the grape clusters, and crushing the berries;
   b. adding between 0.1 and 10 g/hL of pectolytic enzyme and/or cellulases and/or hemicellulases to the crushed berries of step (a) and pressing said mixture of crushed berries and enzymes in a pneumatic press separating grape juice from skins and seeds;
   c. clarifying the grape juice obtained in step (b), separating by decantation solids from grape juice by adding between 0.1 and 10 g/hL of pectolytic enzymes, cellulases and hemicellulases;
   d. fermenting the clarified grape juice of step (c) by adding yeasts selected from Saccharomyces cerevisiae genus at doses between 10 and 50 g/hL and nitrogen compounds at doses between 10 and 100 g/hL;
   e. clarifying the wine obtained in step (d) by physically separating the solid residues generated in the fermentation step by using drawing-off and/or centrifugation and/or earth, tangential or cloths filters; obtaining a wine with a turbidity level between 20 and 100 NTU;
   f. stabilizing the wine from precipitation of tartaric salts;
   g. adding hops or derivatives thereof to the wine obtained in step (f) at a dose between 0.1 and 10 g/L and macerating at room temperature for a time between 1 hour and one month;
   h. mixing in an isobaric tank between about 30% and about 70% of the wine of step (g) and between 70% and 30% vegetable water or water, between 0.1% and 10% white wine concentrate and concentrated white grape juice in a volume as to provide 0.1 to 200 g/L of sugar to the total mixture, wherein the vegetable water is obtained as a byproduct of fruit and/or vegetable juice concentration process, through the condensation of vapors generated in the concentration process which involves subjecting filtered and clarified juice to temperatures between 50 and 100° C. in order to concentrate its solids with total or partial removal of water;
   i. fermenting the mixture obtained in step (h) adding 15 to 30 g/hL of yeasts selected from Saccharomyces cerevisiae, Saccharomyces bayanus, Torulaspora delbrueckii, Schizosaccharomyces, Zygosaccharomyces, or Kluyveromyces and fermenting for a time from 1 hour up to 1 month at temperature between 8 and 30° C.; wherein between about 10 and about 50 g/hL of nitrogen compounds are added; obtaining a pressure of the gas generated in this fermentation varying from 100 kPa to 600 kPa; and
   j. filtering the beverage obtained in step (i) at temperatures under 10° C. adding concentrated white grape juice in a volume to provide between 0.1 and 200 g/L sugar or directly adding sugar together with acid citric at a concentration from 10 to 50 g/L and from 0 to 50 g/L, respectively.

2. Process for obtaining a sparkling alcoholic beverage according to claim 1, further comprising adding in step (c) between 30 and 50% v/v water or vegetable water.

3. Process for obtaining a sparkling alcoholic beverage according to claim 1, further comprising adding in step (d) hops or derivatives thereof at a dose between 0.1 and 10 g/L.

4. Process for obtaining a sparkling alcoholic beverage according to claim 1, wherein the stabilization of the wine in step (f) of precipitation of tartaric salts, is carried out through cold treatment at temperatures in the range of −2 to −6° Celsius.

5. Process for obtaining a sparkling alcoholic beverage according to claim 1, wherein the stabilization of the wine in step (f) of precipitation of tartaric salts, is carried out by addition of carboxymethylcellulose in doses between 0.1 and 10 g/hL.

6. Process to obtain a sparkling alcoholic beverage according to claim 1, further comprising adding activated carbon to the grape juice obtained in step (b) at a dose between 0.1 and 10 g/L to remove color, phenols and/or aromas, and filtering subsequently to remove carbon particles.

7. Process for obtaining a sparkling alcoholic beverage according to claim 1, wherein the nitrogen compounds are selected from ammonium salts, amino acids, peptides and polypeptides.

8. Process for obtaining a sparkling alcoholic beverage according to claim 1, wherein the fruits are selected from stone fruits, pomes, blackberries, strawberries, raspberries, blueberries, apple, grape.

9. Process for obtaining a sparkling alcoholic beverage according to claim 1, wherein the concentrated wine used is obtained by subjecting wine at temperatures between 50° and 100° Celsius to evaporate wine volatiles and concentrate solids.

10. Process for obtaining a sparkling alcoholic beverage according to claim 1, wherein hops and/or its derivatives also made reference to flowers, plant parts, oils, essences, and other plant derivatives.

* * * * *